United States Patent
Schmidt

(10) Patent No.: US 9,228,856 B2
(45) Date of Patent: Jan. 5, 2016

(54) ROTATIONAL ANGLE SENSOR SYSTEM AND METHOD FOR THE PRODUCTION THEREOF

(75) Inventor: Winfried Schmidt, Wassertrüdingen (DE)

(73) Assignee: OECHSLER AKTIENGESELLSCHAFT, Ansbach (DE)

( * ) Notice: Subject to any disclaimer, the term of this patent is extended or adjusted under 35 U.S.C. 154(b) by 497 days.

(21) Appl. No.: 13/519,456

(22) PCT Filed: Dec. 28, 2010

(86) PCT No.: PCT/EP2010/007952
§ 371 (c)(1),
(2), (4) Date: Aug. 6, 2012

(87) PCT Pub. No.: WO2011/079944
PCT Pub. Date: Jul. 7, 2011

(65) Prior Publication Data
US 2012/0306480 A1    Dec. 6, 2012

(30) Foreign Application Priority Data

Jan. 4, 2010  (DE) .......................... 10 2010 004 026
Apr. 17, 2010  (DE) .......................... 10 2010 015 366

(51) Int. Cl.
*B29C 45/14*   (2006.01)
*G01D 5/14*   (2006.01)
(Continued)

(52) U.S. Cl.
CPC .............. *G01D 5/14* (2013.01); *B29C 45/1671* (2013.01); *B29C 45/0013* (2013.01);
(Continued)

(58) Field of Classification Search
CPC ...... B29C 45/1671; G01D 5/14; G01D 5/145; G01B 7/30
USPC ............................... 324/207.25; 264/263, 232
See application file for complete search history.

(56) References Cited

U.S. PATENT DOCUMENTS 3,785,217 A * 1/1974 Peura ............................ 474/190
5,027,067 A * 6/1991 Witzig et al. ............. 324/207.19
(Continued)

FOREIGN PATENT DOCUMENTS

DE     101 20 735 A1    11/2002
DE   10 2007 006445 A1   8/2007
(Continued)

OTHER PUBLICATIONS

International Search Report (PCT/ISA/210) issued on Jun. 6, 2011, by the European Patent Office as the International Searching Authority for International Application No. PCT/EP2010/007952.
(Continued)

*Primary Examiner* — Arleen M Vazquez
*Assistant Examiner* — Robert P Alejnikov, Jr.
(74) *Attorney, Agent, or Firm* — Buchanan Ingersoll & Rooney PC

(57) ABSTRACT

Using integrated multi-component assembly injection molding, a two-part magnetic rotational angle sensor system having high sensing accuracy is very efficiently integrally produced in a tool as a functional unit that can be directly applied, comprising a polymer-bonded permanent magnet as a passive transmitter part in the first section, which can be rotated relative to the material of the active sensor receiver part, which material is sprayed thereon and then shrunk, with the potted receiver. For this purpose, injection molding materials are used that are mutually incompatible for adhesion and lift off from one another over the mutual contact regions due to shrinkage.

9 Claims, 3 Drawing Sheets

Figure 1:
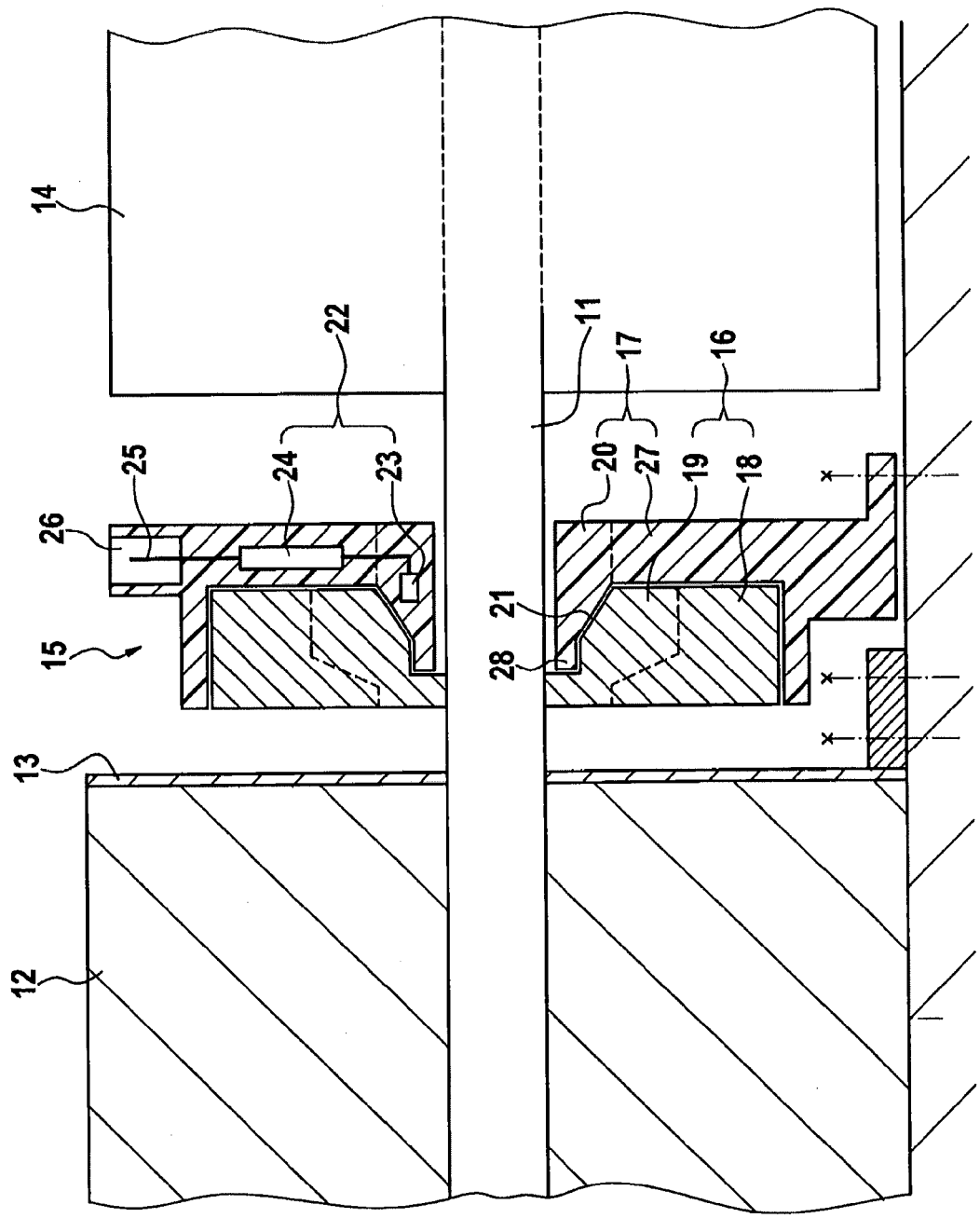

(51) Int. Cl.
*B29C 45/16* (2006.01)
*B29C 45/00* (2006.01)
*H01F 1/055* (2006.01)
*H01F 1/057* (2006.01)
*H01F 1/113* (2006.01)

(52) U.S. Cl.
CPC ............... *B29C 2045/1601* (2013.01); *B29K 2995/0008* (2013.01); *H01F 1/0558* (2013.01); *H01F 1/0578* (2013.01); *H01F 1/113* (2013.01)

(56) References Cited

U.S. PATENT DOCUMENTS

| | | | |
|---|---|---|---|
| 5,544,000 A * | 8/1996 | Suzuki et al. | 361/139 |
| 6,518,753 B1 * | 2/2003 | Apel et al. | 324/207.25 |
| 2004/0177718 A1 * | 9/2004 | Poehlau | 74/640 |
| 2007/0187869 A1 * | 8/2007 | Bierslaker et al. | 264/265 |
| 2009/0243595 A1 | 10/2009 | Theuss et al. | |
| 2010/0180696 A1 * | 7/2010 | Islam et al. | 73/862.332 |

FOREIGN PATENT DOCUMENTS

| | | |
|---|---|---|
| DE | 10 2006 013510 A1 | 9/2007 |
| FR | 2 583 514 A1 | 12/1986 |
| FR | 2583514 A1 * | 12/1986 |

OTHER PUBLICATIONS

Notification of Transmittal of Translation of the International Preliminary Report on Patentability (Form PCT/IB/326) and International Preliminary Report on Patentability (Form PCT/IPEA/409) mailed in corresponding Int'l Patent Application No. PCT/EP2010/007952 dated Aug. 9, 2012; IB of WIPO, Geneva, CH/ISA-EPO, Munich, DE.

* cited by examiner

ROTATIONAL ANGLE SENSOR SYSTEM AND METHOD FOR THE PRODUCTION THEREOF

The invention relates to a sensor system according to the preambles to the main claims.

Such measures are known from FR 2 583 514 A1. There, radially outside of a rotating transmitter disk, a receiver, which, by contrast, is fixedly positioned, is arranged in a manner which is not disclosed in detail in terms of structural design. The receiver can be in the form of a Hall element, in order to receive a sensor signal, where necessary, even when the transmitter disk is stationary. The transmitter disk is situated in axial extension of a belt pulley which is integral therewith, though of smaller diameter. Along its periphery, the transmitter disk is equipped with a large number of mutually spaced grooves, into which a plastic (not specified in detail), equipped with magnetizable particles, is injected. Due to firm adhesion of such plastic magnets in the disk grooves, given a totally flat peripheral surface of the transmitter disk, this transmitter disk, despite a particularly small air gap to the fixed receiver, is said to be able to rotate at particularly high speed without the need for a protective housing, since collisions between the rotating transmitter disk and the fixed receiver are no longer a threat.

DE 1 01 20 735 C2 discloses a geared motor as is used, for instance, for electromotive actuating elements in vehicle or plant construction. For feedback for position control purposes, in the transmission parts produced by plastic injection-molding a two-part sensor system is once again provided, namely a permanent magnet as the passive transmitter part and an active receiver part equipped with a semiconductor element which can be influenced in dependence on a magnetic field. These parts are here inserted in the respective injection mold for the assigned transmission part and are therein molded on or coated. For the transmitter part, it has already been envisioned to integrate this as a polymer bonded permanent magnet in the rotating transmission part by using a multicomponent injection-molding operation.

Despite technological benefits, this procedure too, however, still bears the serious disadvantage of a sequential production sequence, since the transmitter part and the receiver part of the sensor system are produced separately and are then installed one after the other only in the course of assembly of the transmission. That is time-consuming, especially on account of the adjustment and, where necessary, also calibration requirements, which requirements complete the function-critical tolerance chain, namely with respect to the functional interaction of those parts of the sensor system which are movable relative to one another. This is quite a serious cost factor, particularly in the case of compactly built units.

In recognition of these factors, the present invention is based on the technical problem of realizing a rotational angle sensor system of the generic type with an extended range of use due to increased precision, yet with greater cost-effectiveness due to minimized assembly requirements.

This object is achieved according to the fundamental features defined in the main claims. According thereto, the sensor system itself is created with its two mutually movable parts by so-called assembly injection-molding. To this end, a separately cast, sintered and magnetized, polymer bonded permanent magnet can be inserted as the transmitter part into the injection mold for the receiver part, augmenting the cavity of said mold. Into the mold containing the transmitter part, the plastic is then injected to form the receiver part inclusive of the receiver likewise inserted in the mold. The materials for, on the one hand, the transmitter part and, on the other hand, the transmitter part are here distinguished by an, as far as possible, negligible tendency to stick together; wherein a mechanical separation of their, in the injection of the receiver part, initially still touching surfaces of the mutually adjacent materials is aided by strong shrinking characteristics of the material of the receiver part.

On the one hand, the permanent magnet as the transmitter part and, on the other hand, the semiconductor receiver element in the receiver part of the sensor system are inserted into the injection mold, and positioned therein in such a way, manually, or preferably by means of automatic manipulators; this positioning preferably being executed in such a way that, even after the coating with the material for the receiver part, the functionally necessary electrical connections to the receiver element of the sensor system for wiring thereof, remain directly accessible from outside the receiver part.

According to a preferred refinement of the present invention, the permanent magnet of the transmitter part is not however produced separately, so as then only then to complete the cavity of the injection mold for the receiver part, but is instead realized as part of the two-part sensor system in one piece in the tool as part of a multicomponent assembly injection-molding from successively injected materials. Of these, the initially injected and meanwhile solidified material of the transmitter part then forms the aforementioned cavity augmentation of the injection mold for the subsequently to be injected material of the receiver part. In this case, the permanent magnetization of the transmitter part solidified in the injection mold expediently takes place prior to the insertion and coating of the semiconductor receiver element, so as not to overload this element, or a conditioning step downstream thereof, by the extremely strong magnetizing field strength, and so as not to thereby possibly impair its later functioning.

The permanently magnetic transmitter as the passive sensor part in the form of the polymer bonded permanent magnet (so-called PBM) is thus preferably produced directly in the injection-molding assembly tool for the two-part sensor system, in the first shot of the plastic injection-molding. This transmitter part is here preferably formed from a high-performance polymer matrix highly doped (typically to more than 30 percent by volume) with a magnetically hard filler. For this polymer matrix, synthetic part-crystalline polymer, non-fibrous polyamide granulate derived from amino acids, or injection-moldable polyphenylene sulfide is preferably used. For the high-percentage doping thereof, ferrite can be used, but better still rare-earth magnetic material such as finely crystalline neodymium iron boron or samarium cobalt.

As the injection-molding material for the receiver part, which after the assembly injection-molding is rotatable relative to the transmitter part, plastics which are adhesion-incompatible, in terms of material and process, with the polymer of the transmitter part are used. For this, polyesters such as polybutylene terephthalate can preferably be considered, on account of their good wear characteristics, combined with high stiffness and consequently good dimensional stability.

However, a high-molecular-weight formaldehydride-reduced plastic, such as polyoxymethylene, with its low friction coefficient, combined with high dimensional stability after cooling, is also very suitable for the injection-molding of the receiver part onto the already injection-molded transmitter part—as are any injection-molding materials which are distinguished from the highly doped polymer matrix by strong shrinking characteristics.

The semiconductor receiver element which is injected into the receiver part is axially adjacent to the permanently magnetic transmitter part. It is radially offset from the rotational axis of the latter if this sensor system is intended to be mounted on a through shaft.

By contrast, in the event of end face mounting before a stub shaft or direct mounting on an application, the sensor does not need to have a through opening; in this case, the receiver is preferably cast coaxially next to the transmitter part into the receiver part. For such an application-side mounting of the sensor system, the injection-molded receiver part thereof is expediently, at once with application-dependent mounting and connection geometry, tailored to concretely obtaining structural conditions of the application.

Apart from this, the receiver part, with its casting of the receiver element, can at the same time be designed as a protective housing for the sensor system; and, if need be, also with structures, which back-grip the transmitter part, for avoiding disintegration upon the ejection of the two-part sensor system produced in one piece, ready for use, in a single tool by assembly injection-molding.

As the actual receiver element, a standard, commercially available semiconductor element, which, according to the Hall effect or, preferably, according to the magnetoresistive effect, reacts to a momentary magnetic field parallel to the plane of the receiver, can find application in differential bridge circuitry for magnetic-field-dependent rotational angle determination. Such a receiver element is expediently, as a hybrid module calibrated in a directly usable form, already supplemented by a preprocessing circuitry for supplying current to the actual, physical receiver element and for converting an electric signal which has been generated thereby and is then, following conditioning, to be transmitted and is preferably linearly dependent on the rotational angle position.

The spatial arrangement of the receiver in the receiver part of the sensor system can be further optimized with a view to establishing whether the magnetic dipole field of the transmitter part is oriented predominantly parallel to the axis or predominantly radially, and whether only rotational angle steps are counted according to the number of transmitter dipoles acting one upon the other (where necessary, taking account of the rotational direction), or whether angular positions between two successive steps should also be interpolated from the intensity of the magnetic field which just then results within the receiver in a manner dependent on the angular position.

Figure 2A:
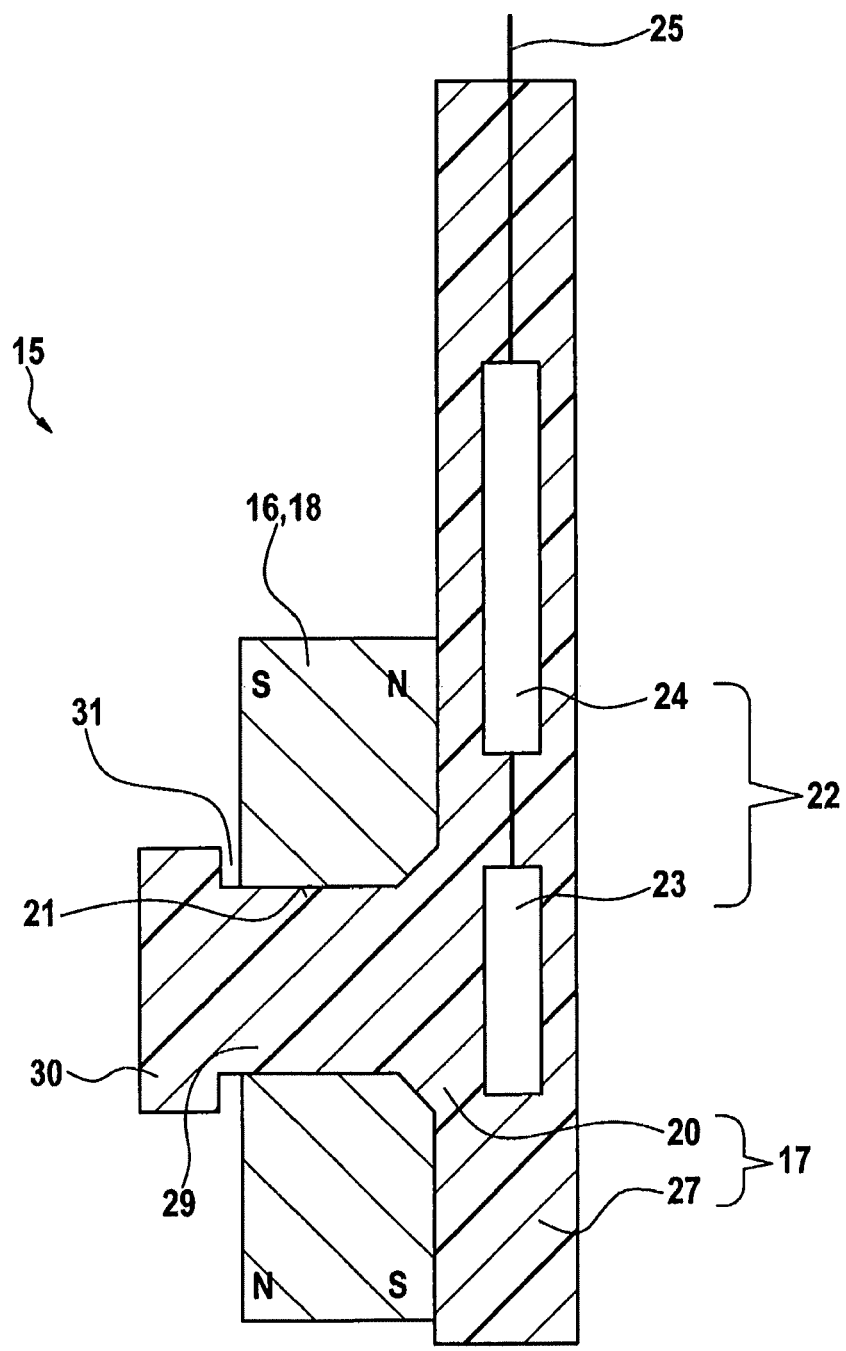
Figure 2B:
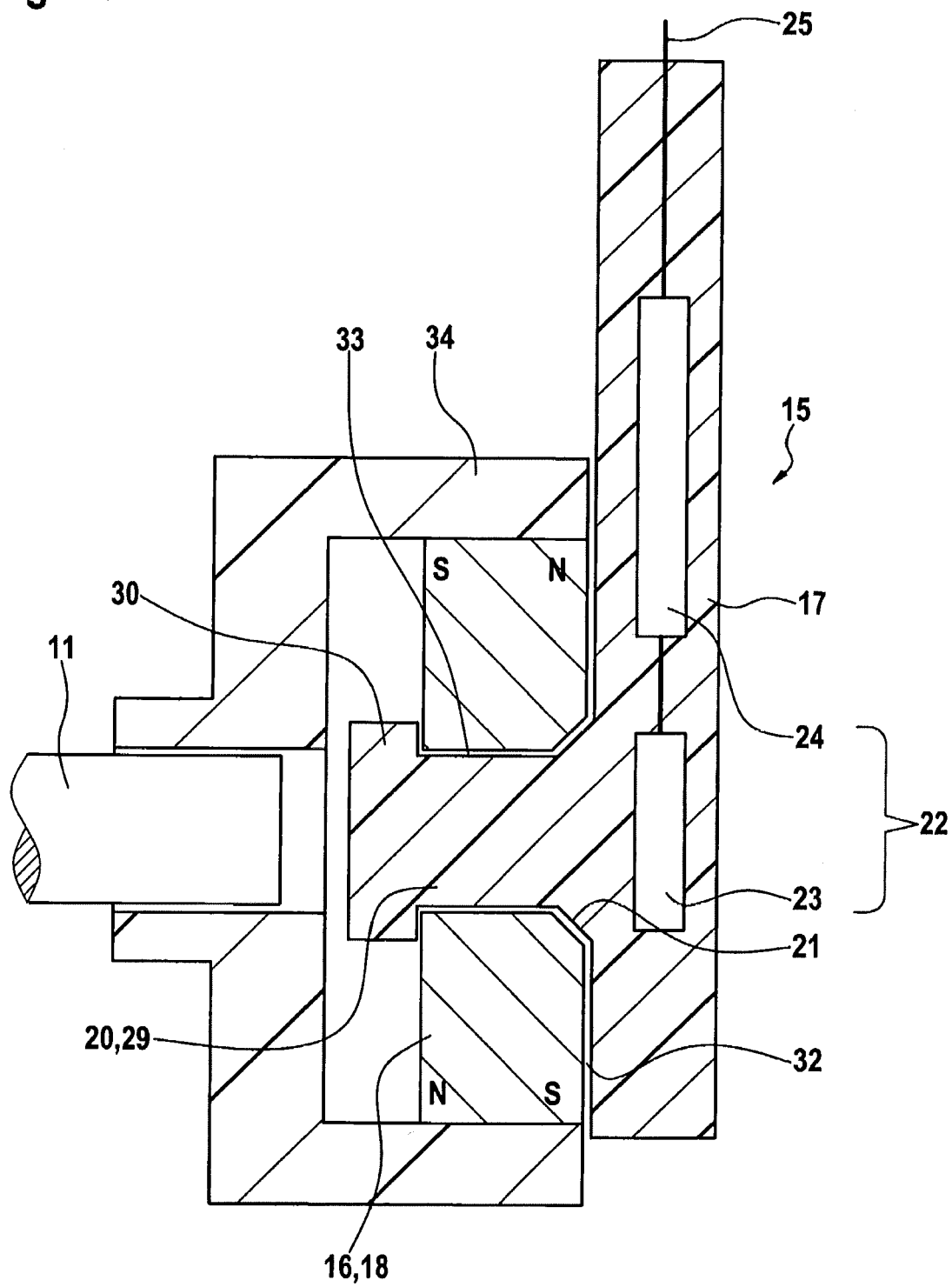

Additional alternatives and refinements of the inventive solution emerge from the further claims and, also with respect to their advantages, from the following description of a preferred illustrative embodiment of the invention, which is sketched in the drawing in not wholly true-to-scale and heavily abstract representation and with restriction to that which is functionally important; on the basis whereof, at the same time, the inventive injection-molding sequence of the assembly injection-molding production process for the two-part, one-piece sensor system is described. In the drawing:

FIG. 1 shows in axial longitudinal section an electromotive actuator, which, on its shaft which passes through it as far as the application, is equipped with an inventive rotational angle sensor system, and FIG. 2 shows an embodiment of such a sensor system, which embodiment is modified in equipment terms for end face connection, in the situation directly after the assembly injection-molding (FIG. 2a), and then after the material shrinkage (FIG. 2b) of the injection-molding materials.

The output shaft 11 of an actuator 12 is here fitted between the bearing shield 13 thereof and an equipment application 14, for instance in the form of a transmission, a swivel flap or like rotatable construction element in vehicle or plant construction, with a two-part permanently magnetic sensor system 15 produced in one piece by plastic assembly injection-molding. This has a transmitter part 16, which is positively or non-positively connected in a rotationally rigid manner to the shaft 11, and a receiver part 17, which is rotatable relative to said transmitter part; which receiver part, for this illustrative description, like the actuator 12, shall be fixedly arranged—which can also, however, for instance with an injection-molded surround 27 of the receiver 22, be fitted directly to the application 14 and can then, for example, also rotate with this latter relative to the actuator 12. In FIG. 1, it is taken into account that the generally fixed receiver part 17 can at least partially enclose the transmitter part 16 in the manner of a housing.

For the rotating transmitter part 16, which can fully consist of its injection-molded permanently magnetic transmitter 18, a polyamide plastic matrix is preferable; and then for the receiver part 17, as the injection-molding material, a high-molecular thermoplastic plastic, such as polyoxymethylene (also called polyacetal or polyformaldehyde), or else polybutylene terephthalate (PBT). If the sensor system is to be designed for higher temperatures, the plastic matrix of the transmitter 18 expediently consists of polyphenylene sulfide, which is resistant to high temperatures, combined with a receiver part 17 made of thermoplastic polymers, as are traded under the designation PA6/6T or Ultramide. Expediently, the materials for the receiver part 17, which is at the same time configured to form the protective housing, are in any event reinforced by fibers and, for the rotating mounting of the transmitter 18, equipped with incorporated lubricants.

For the preferred injection-molding production of the sensor system 15 by assembly injection-molding in a single tool (not represented diagrammatically), the transmitter 18, preferably in the form of a thick perforated disk or a flat hollow cylinder—which transmitter is subsequently to be permanently magnetized in its injection mold—is first injection-molded from one of the specified materials. Its geometric design extends preferably to a tubularly hollow connector component 19, which is cast in the same shot from the same material and in the diagram is indicated as a hub, for a rotationally secure connection to a shaft 11 which reaches through said connector component.

For the connecting component 20 of the receiver part 17, which connecting component is then to be injection-molded, the solidified transmitter part 16 serves as a part-cavity of the injection mold (i.e. of the non-represented injection-molding tool). For this purpose, a central engagement opening 21, which is initially frustoconical and after this transforms into a hollow shaft 28, is recessed as the augmentation of the injection-molding cavity on the transmitter part 16. The receiver part 17, moreover, can then be sprayed as a receiver element surround 27 around the already cast-in and rigidified connecting component 20, preferably made of the same material of the strongest possible shrinking capacity—or else, as sketched in FIG. 1 and FIG. 2, can be sprayed preferably in a manner at once integral with its connecting component 20. Reaching into the center region of the transmitter part 16, which center region is sketched in the shape of a hub as a transmitter connector component 19, is, in any event, a receiver connecting component 20, which is cast-in centrally likewise in the style of a hub.

It is here critical for the functioning of the assembly injection-molding that the materials, on the one hand, of the transmitter part 16 and, on the other hand, of the receiver part 17, upon cooling of these injection-moldings, in the region of the engagement opening 21 and of the radially adjoining interfaces between transmitter part 16 and receiver part 17, do not stick together, and that they, as far as possible, due to shrinkage of the material of the receiver part 17, even lift off somewhat from the transmitter part 16 (with its, because of high doping, scarcely shrinking material). Such shrinkage-based clearance is aided by the conical face of the injection-molding cavity in the form of the transmitter engagement opening 21 for the receiver connecting component 20, which conical face, as sketched, is frustoconical over at least a partial height of the connecting component 20; which transmitter engagement opening then, as sketched in FIG. 1, preferably transforms into the at least short hollow shaft 28 for radial mounting of the receiver part 17 in the transmitter part 16 connected in a rotationally secure manner to the shaft 11.

A mounting function of this type is further improved if a hollow shaft 28, according to FIG. 1, or a solid shaft butt 29, according to FIG. 2, extends as a constituent part of the connecting component 20 of the receiver part 17 right through the transmitter part 16, which preferably consists merely of the permanently magnetic transmitter 18 itself, which is injection-molded and then in the mold is magnetized. Opposite the receiver part 17, a circumferential collar, or simply a few radial lugs which are peripherally mutually offset, can then be formed as an axial stop 30 onto the stub shaft 29, namely on the end face, for instance as sketched, which lugs, from the receiver part 17, axially back-grip the transmitter part 16 against disintegration upon the ejection of the sensor system from the injection mold. In order that the transmitter part 16, however, upon shrinkage of the material of the receiver part 17 (FIG. 2b), is not axially clamped by the stop 30, but instead remains rotatable in a low-friction manner in relation to the receiver part 17, an annular gap 31 (FIG. 2a) is recessed, by means of pushers in the injection mold (not represented), between the transmitter part 16 and the receiver stop 30 for axial play 31 of the transmitter part 16 on the receiver stub shaft 29 (FIG. 2b). Moreover, the shrinkage process of the material of the receiver part 17 also produces that radial play 33 on the stub shaft 29 which is necessary for the relative rotation of the transmitter part 16 in relation to the receiver part 17 (FIG. 2b).

For a rotationally secure connection of the transmitter part 16 on the end face before a shaft 11, according to FIG. 2b a cap-shaped actuating starwheel 34 mounted in a rotationally secure manner on the end face of the shaft 11 can be provided, which actuating starwheel is connected, for instance, in an axially positive or (as sketched) radially non-positive manner to the transmitter part 16.

Axially before the engagement opening 21, recessed centrally in the transmitter part 16, as part of the injection-molding cavity for the receiver part 17 with its stub shaft 29, in FIG. 2 a receiver 22 acting as a sensor is positioned in the injection mold for casting. In the represented example, said receiver consists of the actual, magnetic-field-sensitive semiconductor receiving element 23 and a feed and conditioning element 24 connected thereto by electrical conductors. The internal circuitry thereof protrudes with connectors 25 from the receiver part 17, so as to be externally accessible for solder or crimp connections, or, for instance—as sketched, by way of example, in FIG. 1—to end in a plug cage 26 formed onto the receiver part 17.

The magnetization of the transmitter 18 is preferably realized, as mentioned, already prior to the ejection of the sensor system 15 created by assembly injection-molding, in its injection-molding tool. In order not to put the magnetic-field-sensitive receiver element 23 at risk from the strong magnetic field which is externally introduced for this purpose, this magnetization of the transmitter part 16 expediently takes place already prior to the spraying-on of the receiver part 17 with its therein enclosed receiver element 23. Preferably, the magnetization produces a simple, or a multiply mutually angularly offset magnetic dipole structure parallel to the rotational axis of the transmitter part 16, or in the shape of a volume sector or areal sector. Care must merely be taken to ensure that, in the course of the rotating movement of the transmitter part 16, sufficiently strong stray fields pass through the receiver element 23 oriented parallel to these. In this respect, a dipole magnetization extending diametrically over the rotational axis of the transmitter part 16 would also enter into consideration, though, for the realization thereof, quite a special magnetizing coil would be necessary.

With a prefabricated sintered magnet, preferably, however, through the integrated multicomponent assembly injection-molding, according to the invention a two-part magnetic rotational angle sensor system 15 of high sensing accuracy is thus very rationally produced in one piece as a directly applicable operational unit, preferably with the creation of a polymer bonded permanent magnet as the passive sensor transmitter part 16, which ultimately is rotatable relative to the subsequently concentrically injected and then shrinking material of the active sensor receiver part 17 with its cast-in receiver 22. For this purpose, mutually adhesion-incompatible injection-molding materials which in their mutual contact regions lift off from one another with the aid of shrinkage are used.

REFERENCE SYMBOL LIST 11 output shaft (of 12)
12 actuator (for 14)
13 bearing shield (of 12 for 11)
14 application (with 15)
15 sensor system (consisting of 16 and 17, for 15)
16 transmitter part (of 15, with 18, rotationally secure at 11
17 receiver part (of 15, as support for 22)
18 permanently magnetic transmitter (of 16, rotating in relation to 17)
19 connector component (part or portion of 16)
20 connecting component (part or portion of 17, central in 16/18)
21 engagement opening (in 18+19=16; for the engagement of 20+27=17)
22 receiver (of 17; 22=23+24)
23 receiver element (of 22)
24 feed and conditioning element (of 22)
25 connectors (to 22/24)
26 plug cage (on 17 for 25)
27 surround (of 17 for 22)
28 hollow shaft (on 17; FIG. 1)
29 stub shaft (on 17; FIG. 2)
30 axial stop (for 16 on 29/17)
31 annular gap (between 16 and 30)
32 axial play (between 16 and 17/30)
33 radial play (of 16 on 29)
34 engaging star (for the rotationally secure coupling of 16/18 to 11)

The invention claimed is:
1. A rotational angle sensor system comprising a receiver part with magnetic field receiver in close proximity to a transmitter part, which is rotatable relative thereto, with polymer-bonded-injection-molded permanent magnet as the transmitter, characterized in that the sensor system, given a shaft as a central connecting component between the receiver part and the transmitter part which is rotatable counter thereto, is a combination of a transmitter part, which is formed from poly- mer, with an injection-molded receiver part, which is made of a plastic which is adhesion-incompatible with respect to the polymer and shrinks, wherein the receiver part includes the central connecting component which is injected into an engagement opening in the transmitter part such that the central connecting component reaches through the transmitter part and has a stop which axially back-grips said transmitter part with an axial annular gap between the transmitter part and the stop.

2. The sensor system as claimed in claim 1, wherein the engagement opening transforms, conically tapering, into a hollow cylinder.

3. The sensor system as claimed in claim 1, wherein the receiver cast into the receiver part has a semiconductor receiver element which is interconnected with a feed and conditioning element accessible, via connectors, from outside the receiver part.

4. The sensor system as claimed in claim 1, wherein it is equipped with a through opening for an actuator shaft on which the transmitter part can be fixed in a rotationally secure manner and in relation to which the receiver element of the receiver is cast in the receiver part in a radially offset arrangement.

5. The sensor system as claimed in claim 1, wherein the receiver part is profiled with electromechanical connectors.

6. The sensor system as claimed in claim 5, wherein the electromechanical connectors comprise a plug cage or are configured for mechanical connection to an application.

7. A method for producing a two-part sensor system according to claim 1, wherein successively in one piece, through a multicomponent plastic assembly injection-molding in an injection-molding tool, first the transmitter part with polymer-bonded permanently magnetic transmitter is formed out of relatively non-shrinkable plastic and, once this has hardened thereon, while the receiver thereof is injected, the receiver part is formed out of plastic which is more prone to shrinking than the first-mentioned plastic and is adhesion-incompatible.

8. The method as claimed in claim 7, characterized in that the transmitter part, prior to insertion of the receiver and injection of the receiver part into the injection-molding tool, is magnetized to form the permanently magnetic transmitter.

9. The method as claimed in claim 7, wherein the receiver element of the receiver part is inserted into the injection-molding tool, such that it is axially offset in relation to the already injected and magnetized transmitter part, for casting into the receiver part.

* * * * *